(12) United States Patent
Fraenkel (10) Patent No.: US 8,579,576 B2
(45) Date of Patent: Nov. 12, 2013

(54) ARTICULATED FALSE SEABED

(75) Inventor: Peter L. Fraenkel, London (GB)

(73) Assignee: Marine Current Turbines Limited, Frimley (GB)

( * ) Notice: Subject to any disclaimer, the term of this patent is extended or adjusted under 35 U.S.C. 154(b) by 1019 days.

(21) Appl. No.: 10/581,586

(22) PCT Filed: Dec. 3, 2004

(86) PCT No.: PCT/GB2004/005076
§ 371 (c)(1),
(2), (4) Date: Jun. 4, 2008

(87) PCT Pub. No.: WO2005/061887
PCT Pub. Date: Jul. 7, 2005

(65) Prior Publication Data
US 2008/0232965 A1 Sep. 25, 2008

(51) Int. Cl.
*F03B 13/10* (2006.01)
*F03B 13/26* (2006.01)
*E02B 9/08* (2006.01)

(52) U.S. Cl.
USPC ............. 415/4.3; 415/4.5; 415/7; 415/908; 416/85; 416/142; 416/244 A; 416/DIG. 4; 416/DIG. 6

(58) Field of Classification Search
USPC ............ 290/53, 54; 415/3.1, 4.1, 4.3, 4.5, 7, 415/213.1, 905, 906; 416/84–86, 142, 143, 416/244 A, 244 B, 244 R, 246, DIG. 4, 416/DIG. 6; 417/332
See application file for complete search history.

(56) References Cited

U.S. PATENT DOCUMENTS

| | | | | |
|---|---|---|---|---|
| 1,360,222 A | * | 11/1920 | Johnston | 417/234 |
| 2,501,696 A | | 3/1950 | Souczek | 290/43 |
| 4,864,152 A | * | 9/1989 | Pedersen | 290/53 |
| 6,091,161 A | | 7/2000 | Dehlsen et al. | 290/43 |
| 6,531,788 B2 | | 3/2003 | Robson | 290/43 |
| 6,652,221 B1 | | 11/2003 | Fraenkel | 415/3.1 |
| 6,955,049 B2 | | 10/2005 | Krouse | 60/641.7 |
| 7,105,942 B2 | | 9/2006 | Henriksen | 290/55 |
| 7,291,936 B1 | | 11/2007 | Robson | 290/43 |
| 7,307,356 B2 | | 12/2007 | Fraenkel | 290/54 |
| 7,331,762 B2 | | 2/2008 | Fraenkel | 416/85 |
| 7,352,074 B1 | | 4/2008 | Pas | 290/43 |
| 7,360,993 B2 | | 4/2008 | Fraenkel | 415/232 |

FOREIGN PATENT DOCUMENTS

| | | | |
|---|---|---|---|
| GB | 2 311 566 A | | 10/1997 |
| GB | 2 348 249 A | | 9/2000 |
| GB | 2365905 A | * | 2/2002 |
| WO | WO 99/02853 | | 1/1999 |
| WO | WO 03/056169 A1 | | 7/2003 |
| WO | WO 2004015264 A1 | * | 2/2004 |
| WO | WO 2004/085845 A1 | | 10/2004 |

* cited by examiner

*Primary Examiner* — Edward Look
*Assistant Examiner* — Jason Davis (57) ABSTRACT

A support system for at least one water drivable turbine (1) that when in operation is immersed in a column of flowing water, characterized in that the system includes a deck or raft (3) for supporting said at least one turbine when immersed, the deck or raft (3) having an inherent buoyancy which is such as to enable the deck or raft (3) to rise through the column of water upon reduction of the buoyancy, the arrangement being such that the associated turbine or turbines (1) can be raised above the surface of said column in order to access the turbine for maintenance purposes.

15 Claims, 8 Drawing Sheets

ARTICULATED FALSE SEABED

FIELD OF THE INVENTION

This invention relates to structures for the support of turbines arranged to be immersed in a water current and driven by the kinetic energy of the flow of water.

In our British Patents GB 2256011 B, GB 2311566 B, GB 2347976 and GB 2348250 B and in our British Patent Applications GB 2396666 and GB 2400414 we have disclosed constructions pertaining to water driveable turbines; i.e. a rotor or rotors supported within the water column of the sea, river or an estuary such that the flow of water may turn the rotor(s) to produce either electricity or shaft power for utilisation for a required purpose. It is known how to use turbines for such purposes and moreover structures of various kinds to support such turbines are also known, and have been described.

In particular, the present invention relates to the provision of supporting structures for turbines intended for extracting kinetic energy from water currents; capable of carrying just one turbine or a plurality of turbines. The turbines involved may preferably be of the axial flow (i.e. "propeller") type but may be cross-flow turbines (similar to a Darrieus wind turbine in principle), mounted with their shafts either vertically aligned or horizontally aligned but normal to the direction of the water currents or indeed any kind of practical kinetic energy conversion device.

The type of turbine rotor or rotors the support of which the present invention relates is not fundamental to its novelty, so, in practice, the most cost-effective and efficient type will be preferred.

It is convenient to note that when a turbine or kinetic energy converter (of any kind) is used in such a way that it is driven by a flow of water, the extraction of energy from the flow causes reduction in momentum of the passing water which in turn causes large reaction forces on the turbine which manifest themselves primarily as a thrust force acting in the direction of the flow (i.e. horizontally) and proportional to the numerical square of the mean velocity through the rotor.

OBJECTS OF THE INVENTION

A particular object of the present invention is to provide a support structure, referred to hereinafter as an "articulated false seabed" for the specific purpose of supporting water current turbines (in the sea, a river or an estuary as the case may be).

It is an further particular object of the present invention to provide structures capable of supporting one or more water drivable turbine rotor system(s), for example such as have been already been described in our earlier British Patents GB 2256011 B, GB 2311566 B and GB 2348250 B and in our British Patent Applications GB 2396666 and GB 2400414. However rotors of any type capable of being driven by flowing water in a manner by which they can drive a generator for the production of electricity or they can drive some other useful application such as a pump or compressor could also be applied with the present invention. Said rotor(s) may most generally be of the following types:—

- axial flow or propeller type (i.e., with rotor(s) which rotate about an axis approximately aligned to the direction of flow)
- cross-flow (or Darrieus type) (with rotor(s) which rotate about an axis set approximately normal to the direction of flow and generally vertical but also possibly horizontal)

Said turbine rotors, of whichever kind, are immersed entirely within the water column of flowing currents, whether they be in the sea, in rivers or in estuaries, and which in various ways to be described meet the aforementioned requirements. In other words the active components remain completely submerged throughout their normal mode of operation.

However an important object of this invention is to provide means by which the rotors and other critical moving parts, such as the power train, can be raised clearly above the surface of the water to permit safe and effective access from a surface vessel for installation, maintenance, repairs and replacement of said components. The meaning of the term "power train" in this context is the component which is driven by the rotors in order to produce electricity, pump water or undertake some useful purpose; for example, in the first case it may typically consist of a gearbox or speed-increaser coupled to an electricity generator which will serve the purpose of converting the slow rotating movement of the turbine rotor to the speeds needed for effectively generating electricity.

A further objective of this invention is to be able to sweep as large a cross-section of fast-moving water as possible with energy collecting rotors (since the overall energy capture will be proportional to the cross-sectional area of current that can be accessed by the rotor(s)). A further objective will be to position the rotor(s) as high as possible in the water column in order to access the fastest moving currents (since the fastest moving currents tend to be in the upper half of the water column). Hence it is expected that in most embodiments of the invention a plurality of rotors will be arranged in a horizontal row normal to the direction of flow on the supporting structure to be described. However in special circumstances the invention could be applied with no more than a single turbine rotor.

Moreover in a location with tidal currents, the flow will generally be bi-directional, moving in one direction with the flood tide and in the reverse direction with the ebb tide. Therefore a further important objective is for the support structure and the rotor(s) supported thereon to be able to function equally effectively with the flow approaching from either of two opposite directions when applied in a marine or estuarial tidal environment.

STATEMENTS OF THE INVENTION

According to a first aspect of the invention there is provided a support system for at least one water drivable turbine that when in operation is immersed in a column of flowing water, characterised by a deck or raft having an inherent buoyancy whereby the deck or raft is adapted for flotation when it is desired to raise the associated turbine or turbines above water level.

According to a second aspect of the invention there is provided a support system for a least one water drivable turbine that when in operation is immersed in a column of flowing water, characterised in that the system includes a deck or raft having an inherent buoyancy which is such as to enable the deck or raft to rise through the column of water upon reduction of the buoyancy, the arrangement being such that the associated turbine or turbines can be raised above the surface of said column.

Preferably the support system is characterised by a inherently buoyant deck or raft, having a rectangular cross section in a horizontal plane.

Preferably the deck or raft has a planar smooth surface of approximately rectangular form with rounded corners or slightly curved edges plan form (i.e., when viewed from directly above).

In a preferred arrangement said rectangular deck or raft is of such construction as to be free from undesired flexural movements the arrangement is such as to provide adequate structural integrity so as not to flex unduly.

Preferably the upper surface of the deck or raft exhibits an even and smooth surface immediately below the turbine or row of turbines mounted thereupon, the presence of the deck or raft upper surface serves enhance the evenness of flow over the surface thereof as compared with the flow over the generally rough and uneven surface of natural sea beds.

Conveniently the planar smooth surface acts as a support structure and also performs like a "false seabed" by providing an even and smooth surface immediately below the turbine or row of turbines the arrangement being such that it serves enhance the evenness of flow over the surface thereof as compared with the flow over the generally rough and uneven surface of natural sea beds.

BACKGROUND OF THE INVENTION

Before considering detail of particular embodiments of the invention it is convenient to note that when a turbine or kinetic energy converter (of any kind) is used in such a way that it is driven by a flow of water, the extraction of energy from the flow causes reduction in momentum of the passing water which in turn causes large reaction forces on the turbine which manifest themselves primarily as a thrust force acting in the direction of the flow (i.e. horizontally) and proportional to the numerical square of the mean velocity through the rotor.

This phenomenon is a consequence of the laws of physics, resulting from the transfer of momentum in the flowing water to the moving turbine components, and will occur regardless of the type of turbine rotor that is used. In general, the more powerful and efficient the turbine rotor, the greater the forces that need to be resisted, although under certain conditions, such as a so-called "run away" caused by loss of load, large thrust forces can be produced even when the turbine is not delivering much, or indeed any, usable power to the shaft of the turbine. This condition is of course a direct consequence of the fact that the forces needed to hold the rotor in position are the reaction to the forces transmitted to the turbine rotor in order to rotate it, which in turn give a measure of its efficacy for the generation of shaft power.

Moreover, in practice any such turbine is exposed to numerous cyclic loads caused by phenomena such as the effects of turbulence, passing waves, velocity shear in the water column (i.e. variation in velocity with depth) and vortex shedding, all of which will impose fluctuating fatigue loadings on the support structure. Such fluctuating loads need to be allowed for in providing adequate structural integrity. Therefore an essential requirement for any such turbine is that the rotor which extracts the energy must be held securely in position in the moving water column by a structure with adequate reserves of strength to resist the static and also the dynamic forces imposed on the rotor.

Provision of such a structure to which the present invention elates in practice complicated by a number of other general requirements, namely:— the wake generated by the presence of the support structure in the water column shall not unduly interfere with the flow through the rotor or rotors (or it would reduce the efficiency of said rotor(s)). In fact the structure preferably needs to be configured such that its wake ideally completely misses the rotor(s).

the structure should also be as economical to manufacture as possible in order to minimise the costs of the system, there needs to be some practical and cost-effective method for installing the supporting structure in a location with strong currents, there needs to be some practical and cost-effective-method for installing the turbine rotor or rotors onto the structure and then for gaining access to the rotor or rotors and their associated power trains in order to maintain and when necessary to replace or repair them.

there needs to be some provision for the eventual removal for repairs, replacement or decommissioning of the structure Various more detailed considerations relate to the provision of a support structure for water current turbines include factors such as follows:—

Firstly, it should be noted that the flow in the water column at locations with high current velocities varies with depth such that the maximum velocity tends to be near to the surface. Conversely, the currents low in the water column, near the sea (or estuary or river) bed move much more slowly. Moreover, any uneven natural features in the sea, river or estuary bed will cause disruption of the flow near the seabed and extra turbulence; the more uneven and rougher the nature of the bed, the greater will be the thickness of a slower moving and turbulent lower layers.

Secondly, it should be noted that for efficient and reliable extraction of kinetic energy from water currents, using a turbine rotor of the kind proposed, it is desirable for water flow through said rotor to be as uniform as possible in velocity across the area swept by the rotor or rotors, to move as fast as possible and to have as little turbulence as possible. In other words it is desirable to have means to position the active rotor(s) in the fastest and most uniform and turbulence-free flows, avoiding the rotor cutting through any boundary layer or wakes caused by flow over an uneven sea, river or estuary bed. It is also essential to support any such rotor(s) with a structure capable of resisting for many years the most extreme static and dynamic forces that will be experienced.

Thirdly, an important further consideration is that any device immersed in the currents in a water column (whether in the sea, a river or an estuary) will need to be accessed occasionally for maintenance, repairs or replacement. Underwater operations in fast flowing currents, whether by human personnel wearing diving equipment or whether by Remotely Operated underwater Vehicles (ROVs), are extremely difficult or even impossible. As a result a fundamental problem to be addressed by this invention is the provision of means for accessing all components needing maintenance or repair, in particular the turbine rotor(s) and/or hydrofoils together with the mechanical drive train and generator which they activate, by making it possible to raise said items above the surface of the flowing water current so that access from a surface vessel is possible and no underwater intervention by divers or remotely operated submersible vehicles is needed.

BRIEF DESCRIPTION OF THE DRAWINGS

For a better understanding of the invention and to show how to carry the same into effect, reference will now be made to the accompanying drawings which illustrate the invention in relation to the technology concepts described earlier in which.

DETAILED DESCRIPTION OF THE DRAWINGS

Referring now to FIGS. 1 to 4 a row of five axial flow turbines are individually mounted upon an associated support column or the like (2). The five columns (2) are mounted in side by side relationship on the upper surface of a planar wing-like platform or false seabed structure (3).

It should be noted that the type of turbine is unimportant in so far as the present invention is concerned, since alternatives such as the Darrieus Cross-Flow turbine or others could also be used. The planar wing-like platform or false seabed structure (3) is attached via struts (5) located one adjacent opposite end regions of the false sea bed structure (3) to anchor points (6) in the seabed. These anchor points (6) will generally be short piles or ground anchors drilled into the seabed as schematically illustrated, but they could also be any other form of anchor capable of engaging the seabed with sufficient resistance to horizontal displacement/movement.

The struts (5) are aligned in the direction (or close as possible to the direction) of flow of the current and are securely fixed to an associated anchor point (6) by way of a hinged joint (7) and to the planar wing like platform or false sea bed structure (3) by way of another hinged joint (8). The hinged joint (7) may comprise a pinned joint, a ball joint or any form of joint which will permit articulation of the struts (5) such that it/they may be rotated through a vertically disposed arc relative to the sea or river bed (SB). The joint (8) may in some cases be similar to the associated joint (7) or, in some cases as will be described later, may comprise a non-flexible but breakable connection to attach the strut rigidly to the planar wing-like platform or false seabed structure (3).

The joint (8) when in the form of a hinged, pinned or ball type of flexible joint may also preferably be able to be locked mechanically such that it is prevented from flexing or pivoting other than at times when said locking mechanism is released. Since the details of how this joint may be locked are not fundamental to the invention they are therefore not explained or presented here.

A primary reason for either using an inflexible connection or a flexible connection that can be locked and temporarily rendered inflexible at (8) is to prevent the planar wing-like platform or false seabed structure (3) with its row of turbines (1) from being able to be tilted or rotated relative to the strut(s) (5) by the moment of the thrust forces caused by the rotors interaction with the current.

One or more supports (4) is or are provided for the platform or seabed structure (3) and its turbines (1). The support or supports may be embedded in the seabed (SB) as illustrated or it may be simply resting on the seabed and held in place by friction or other means. Although only one such support is illustrated, two or more supports may advantageously be used.

Figure 1:
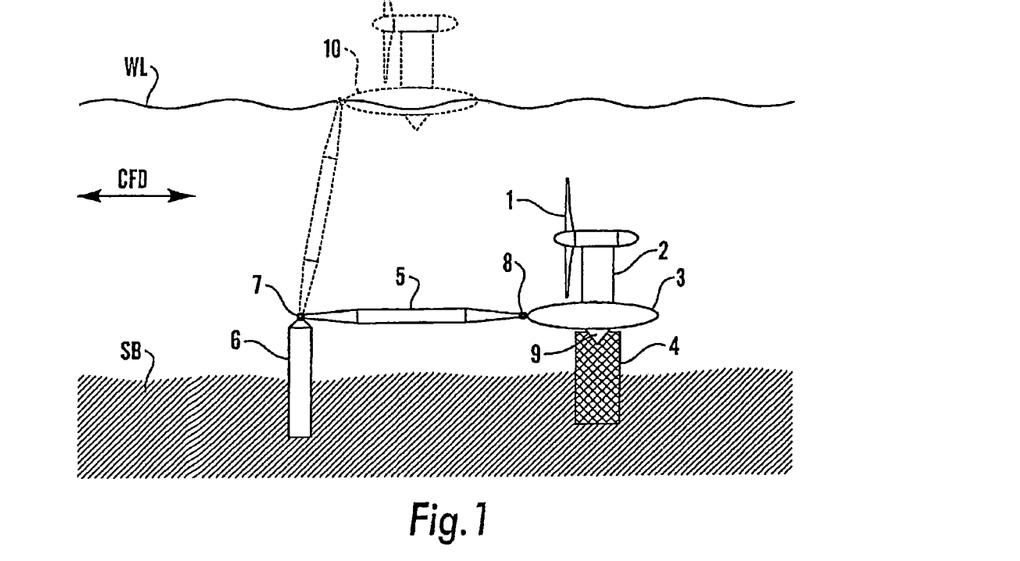
FIG. 1 is a side elevation illustrating a turbine installation support structure incorporating the concepts of the present invention and when the associated turbine(s) are in their operational positions.
Figure 2:
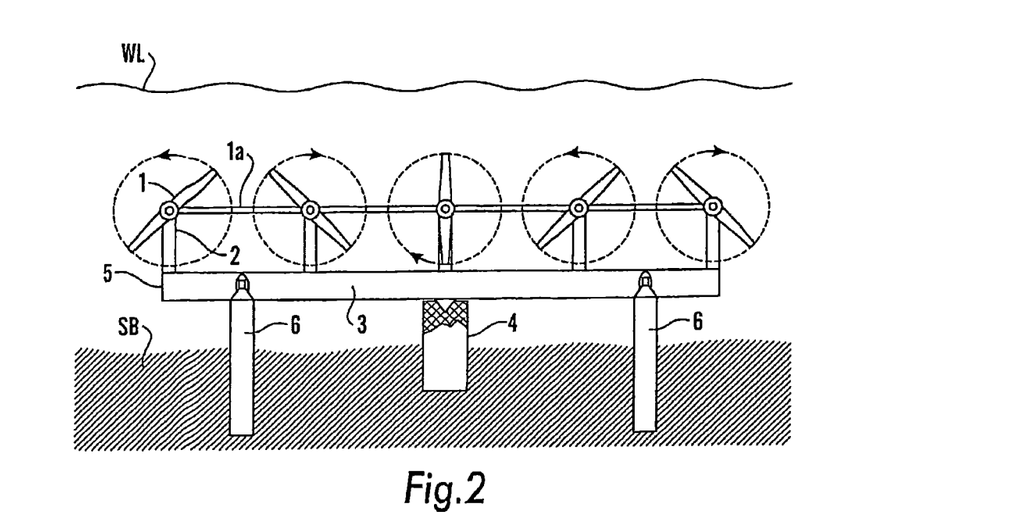
FIG. 2 is a front elevation of the turbine installation support structure of FIG. 1.
Figure 3:
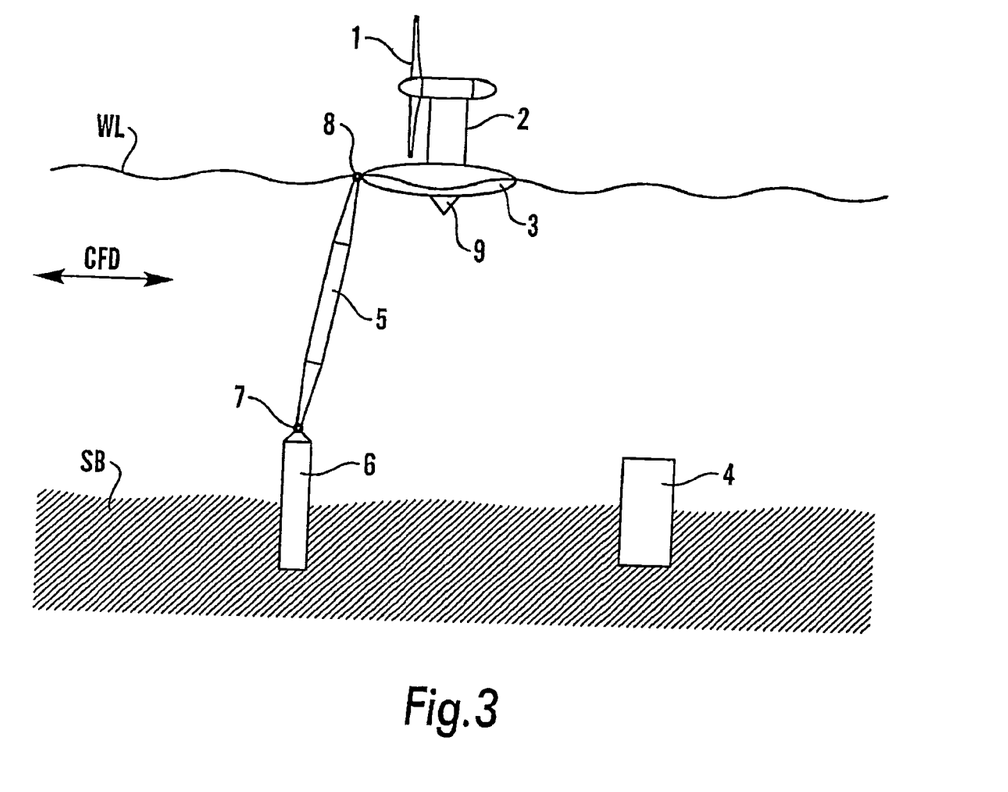
FIG. 3 is a side elevation of the structure of FIGS. 1 and 2, when the turbine installation has been raised so as to be non submerged.
Figure 4:
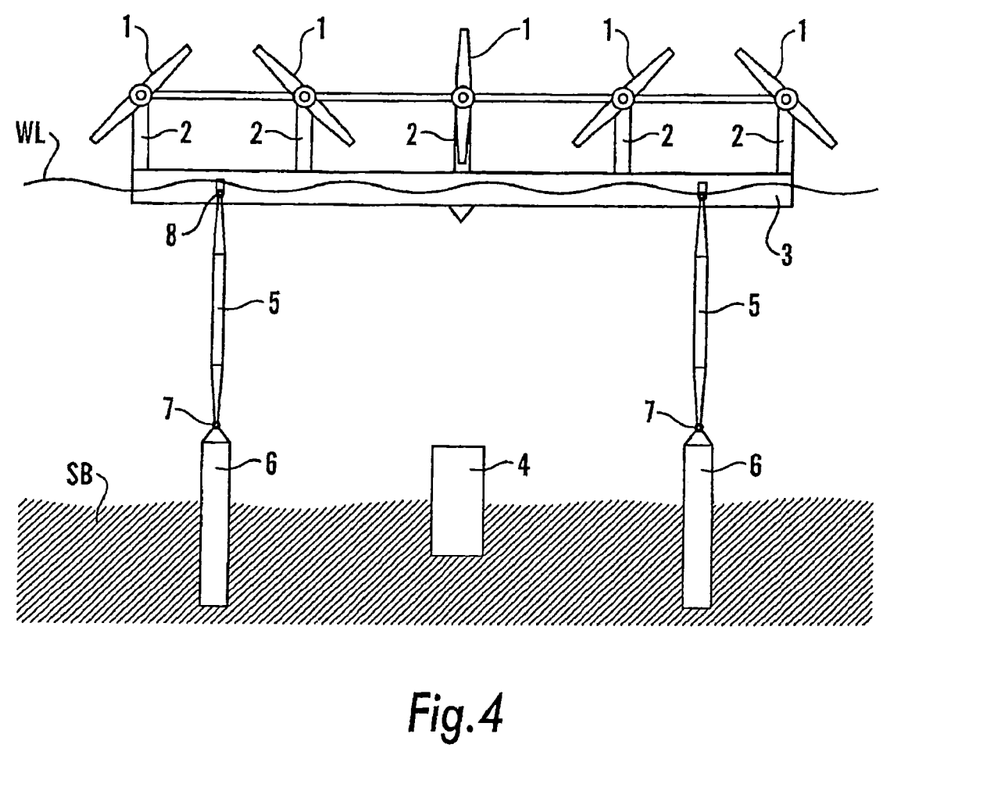
FIG. 4 is as front elevation of the structure and associated installation shown in FIG. 3.

The provision of the articulated joints (7) and (8) is to enable the planar wing like platform or sea bed structure (3) to be raised from the position shown in FIGS. 1 and 2 to the position shown in FIGS. 3 and 4

The way in which the planar wing like structure can be raised to the water level is shown in FIG. 1 by broken lines (10) (ghosted). The Figure also indicates how the struts (5) are able to turn through a vertical arc.

A single support (4) (not shown as such) may also be used which extends laterally (i.e. normal to the direction of the currents) for the full width of the planar wing-like platform or false seabed structure (3). This arrangement leaves no space for water to flow beneath the planar wing-like platform or false seabed structure (3) and may be advantageous in increasing the flow through the row of rotors mounted above the platform, however installing and fixing such a support may be more difficult than where relatively small, pile like supports are employed.

As shown in FIGS. 1 and 2 a wedge-shaped keying device (9) is provided on the underside of the planar wing-like platform or false seabed structure (3) so as to engage and more accurately position it with respect to its sea level support (4) when it is presented to the support and particularly when being lowered into the operational position shown in solid lines in FIG. 1.

As mentioned FIG. 2 is a front elevation of the same system shown in FIG. 1 and illustrates the mounting of the five axial flow twin-bladed turbine rotors (1). This view also shows a set of smaller cross-section horizontal struts (1a) at the level of the rotors axes to add strength to the structure. whilst these struts (1a) are not an essential requirement for this invention the purpose and function follows from the disclosure of our co-pending patent application GB 2400414 Water Powered Turbines Installed On A Deck Or False Sea Bed. In practice, a number of the details described in said co-pending patent application could be applied in conjunction with the proposals of the present Application.

FIGS. 3 and 4 show the same side and front elevations of the system shown in FIGS. 1 and 2 respectively, but in the raised position so that the deck, wing or false seabed structure (3) is raised to the surface of the water. It can be seen that when raised the strut(s) (5) will effectively act as moorings, their articulate joints (7 and 8) permitting motion under wave action but preventing the system from moving away under the influence of the currents.

The method for lifting the planar wing-like platform or false seabed structure (3) with its row of turbines (1) could preferably involve making the planar wing-like platform or false seabed structure (3) buoyant so that it tends to float on the surface, but for the purpose of implementing this invention other means may also be used to lift it, such as a crane or winch on a vessel. Alternatively if the system is near to neutral buoyancy then small forces such as from thrusters or water jets may be used to bring the turbines to just below the surface, and a crane on a surface vessel may be used to lift the turbines clear of the surface.

If buoyancy is used as the method for raising the planar wing-like platform or false seabed structure (3), then this could be controlled by flooding the interior of it to sink it and by pumping the water out to raise it, or alternatively it may be permanently buoyant, in which case a positive means is needed to counteract the lifting forces of buoyancy and pull it down, as will be disclosed in more detail later.

Lastly the articulated struts (5) used to restrain the planar wing-like platform or false seabed structure (3) may preferably be of streamlined cross-section so as to minimise their drag in the current when the system is raised to the surface.

Figure 5:
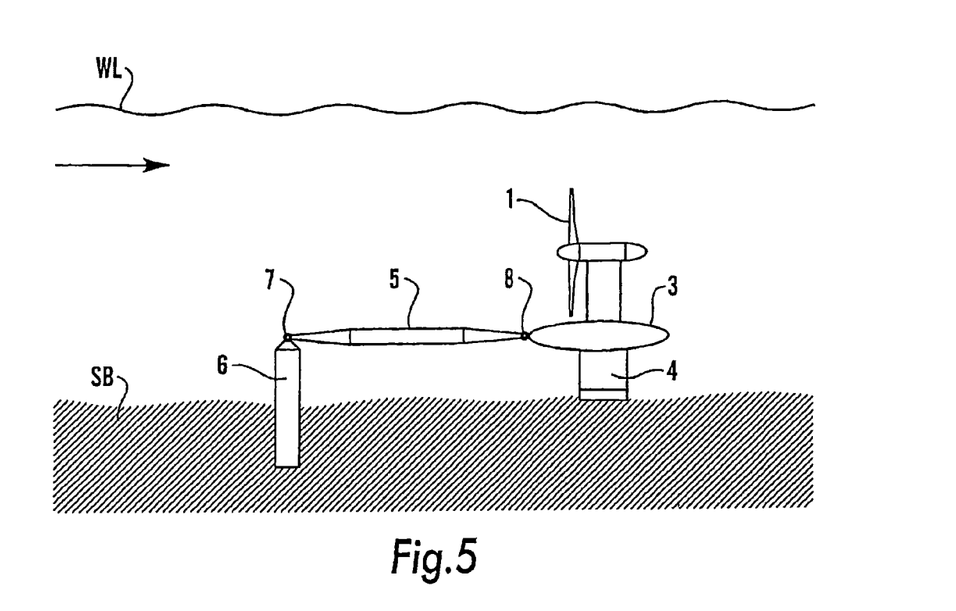
FIG. 5 is a side elevation illustrating a second embodiment of a turbine installation support structure incorporating the concepts of the present invention and when the associated turbine(s) are in their operational positions.
Figure 6:
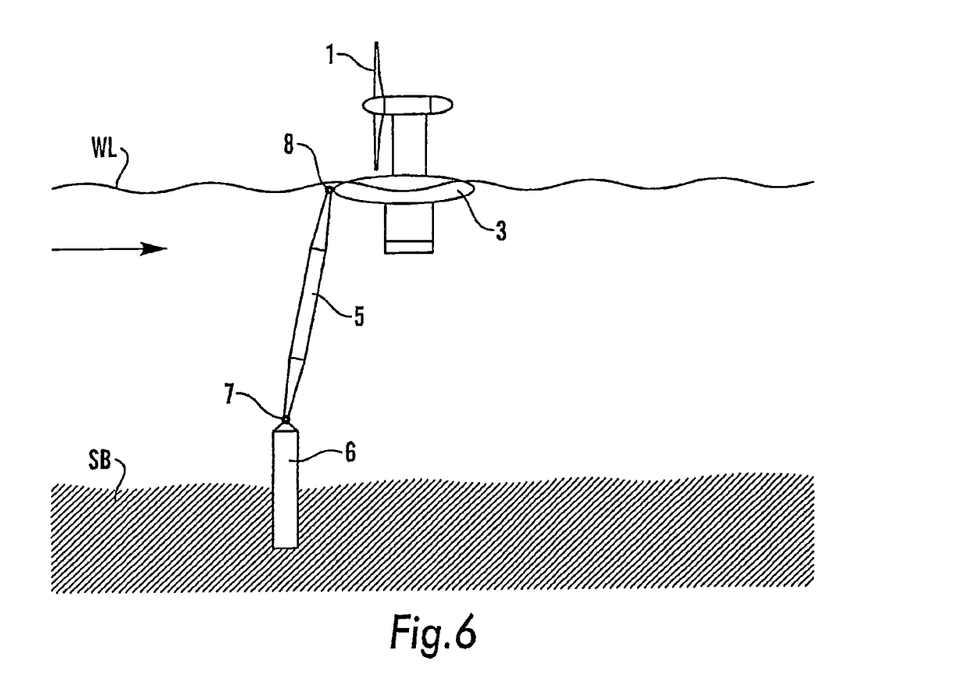
FIG. 6 is a side elevation of the structure of FIG. 5, when the turbine installation has been raised so as to be non submerged.

FIGS. 5 and 6 show how the support(s) (4) illustrated in the earlier figures may alternatively be attached to the lower surface of the deck, wing or false seabed (3) rather than to the actual sea or river bed. In this embodiment the support(s) (4) are designed to settle onto the sea bed or river bed when lowered as in FIG. 5. Since the sea bed or river bed may in many cases be uneven, prone to scour or have a rough surface, the support(s) as used in this embodiment may advantageously be adjustable (as shown schematiclly in FIGS. 5 and 6 by a horizontal line) so that they can be extended or retracted by some small distance, perhaps of the order of 1 or 2 metres, to adjust the height that the planar wing-like platform or false seabed structure (3) settles above the seabed or riverbed. This adjustment may also be used to level the planar wing-like platform to cater for unevenness in the seabed or riverbed in the case where two or more supports are used. This facility for adjustment is not illustrated in the FIGS. 5 and 6 but may be implemented by any convenient mechanism including, for example, hydraulic rams, mechanical screw-jacks, springs, etc.

Figure 7:
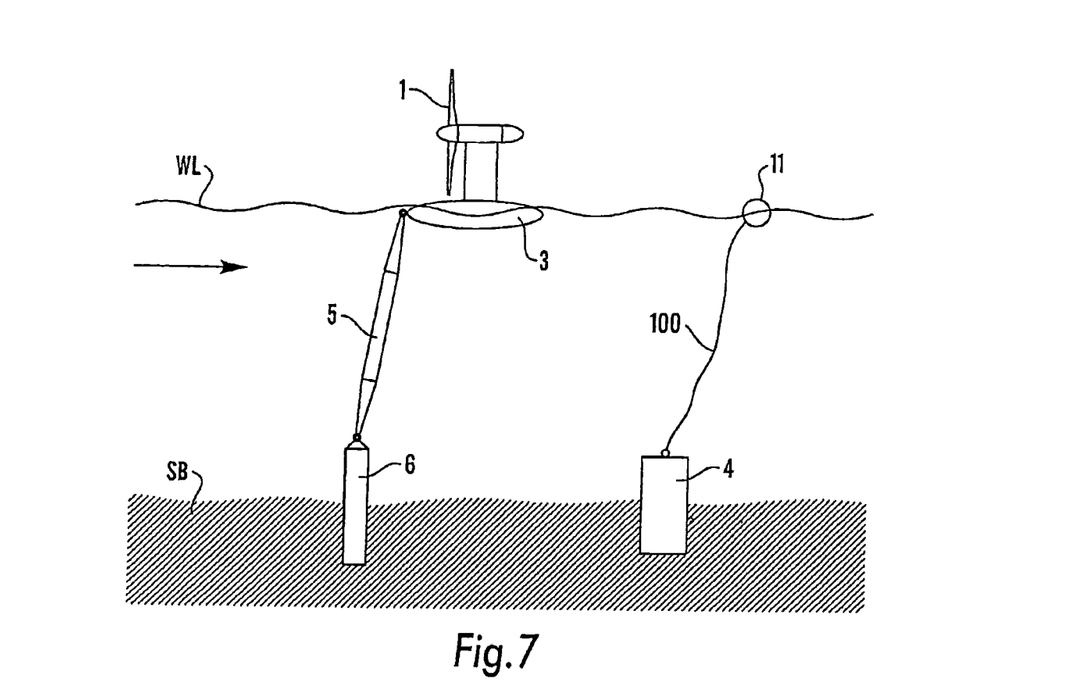
FIG. 7 is a side elevation illustrating a third embodiment of a turbine installation support structure incorporating the concepts of the present invention and when the associated turbine(s) are in their operational positions.
Figure 8:
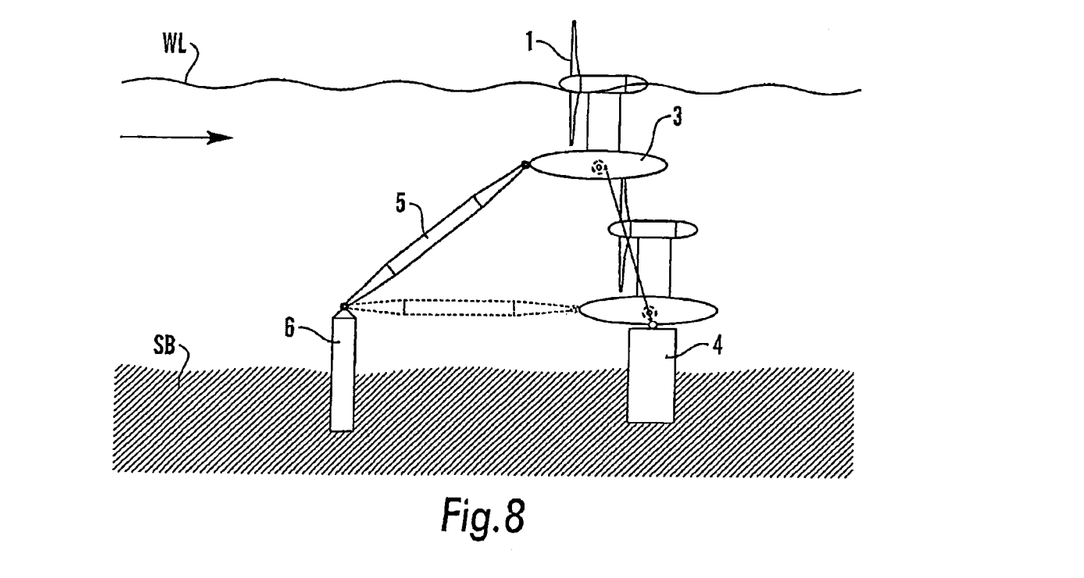
FIG. 8 is a side elevation of the structure of FIG. 7, when the turbine installation has been raised so as to be non submerged.

Although the deck, wing or false seabed structure (3) may be made to sink by flooding it with water, and to rise again by pumping air into it to displace the water, as previously described, an alternative method of controlling its position is shown in FIGS. 7 and 8. Here a cable (100) (or a plurality of cables) is provided which is (are) attached to the support (or supports) (4) set into the seabed. This cable(s) can be supported by a buoy (11) as in FIG. 7 when the floating deck, wing, or false seabed is absent or being swapped for a replacement. When the false seabed structure (3) is attached to its struts (5), then as indicated in FIG. 8 the aforementioned cable(s) (100) can be attached to a winch (not shown) located within the floating deck, wing or false structure (3) and this winch can pull the system down to the seabed counteracting its buoyancy; FIG. 8 illustrates the situation when the structure (3) has been partially pulled down to the seabed (SB) and the final resting position when winched fully down is shown ghosted.

A similar concept could be used in which the aforementioned cable shown in FIG. 8 could be replaced by a rigid member or strut, or by a chain. In the case where a strut is used the structure (3) would be raised by driving the strut downwards using a rack and pinion or by using some other appropriate mechanism.

Figure 9:
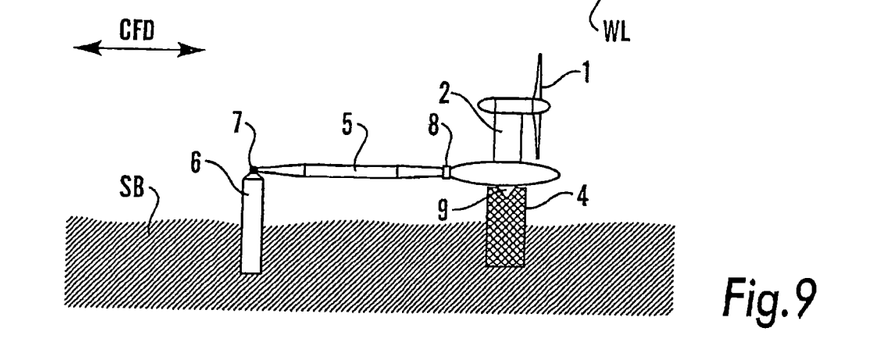
FIG. 9 is a side elevation illustrating a fourth embodiment of a turbine installation support structure incorporating the concepts of the present invention and when the associated turbine(s) are in their operational positions.
Figure 10:
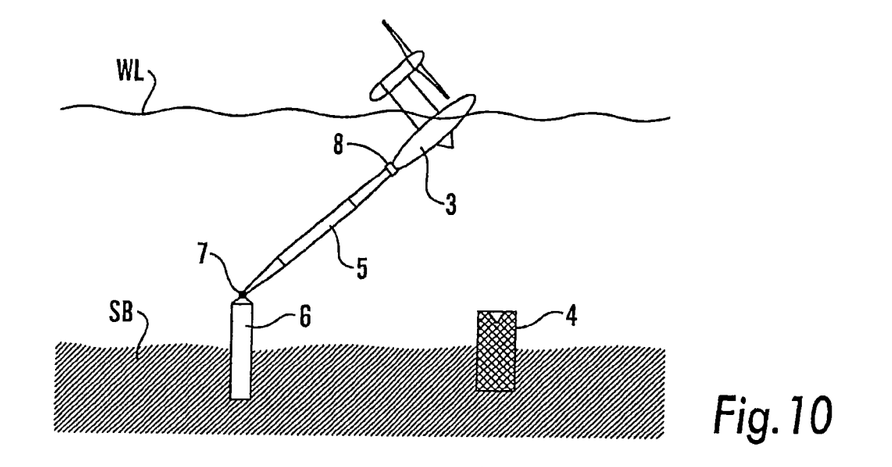
FIG. 10 is a side elevation of the structure of FIG. 9, when the turbine installation has been partly raised so as to be non submerged.
Figure 11:
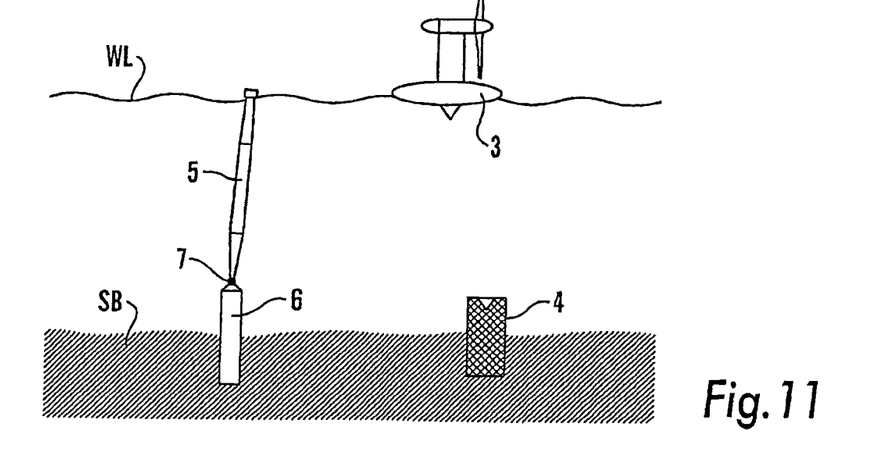
FIG. 11 is a side elevation of the structure of FIG. 9, when the turbine installation has been fully raised so as to be non submerged.

FIGS. 9, 10 and 11 show an alternative embodiment in which the ends of the struts (5) attached to the floating deck, wing or false structure (3) connecting point (8) may be rigidly attached rather than pinned (an option previously outlined) and where the rigid joint is also able to be disconnected.

FIG. 9 shows the system deployed in its operational position resting on a support (4) connecting with the sea or river bed much like the fully articulated embodiment of FIGS. 1, 2, 3 and 4. FIG. 10 shows how, with this arrangement, the system can be floated or otherwise lifted to the surface where it will take up an angled position, with the turbines partially out of the water and with the planar platform or wing remaining aligned with the strut(s) (5) at an angle to the surface. Clearly when the flow of current is from the right it will tend to assist in lifting the system and vice-versa. If the system is near to neutrally buoyant, then this may be the principal method used for generating the forces needed to lift and lower it.

Then if it is desired to remove the system perhaps for maintenance or repairs, means will be provided to disconnect it from the struts as in FIG. 11. The struts (5) are hollow and may be air-filled such that they will float if required so as to be easily reconnected when a system is installed or replaced. Alternatively they may be marked with temporary buoys and allowed to fall back to the seabed or river bed.

Figure 12:
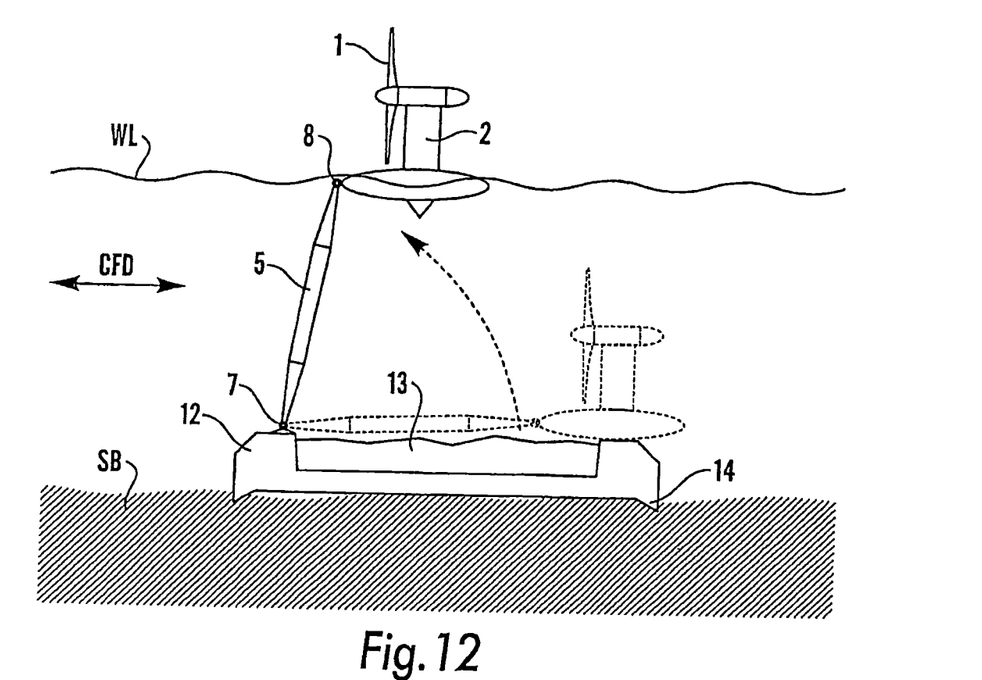
FIG. 12 is a side elevation illustrating a further embodiment of a turbine installation support structure incorporating the concepts of the present invention and when the associated turbine(s) are in their operational positions.
Figure 13:
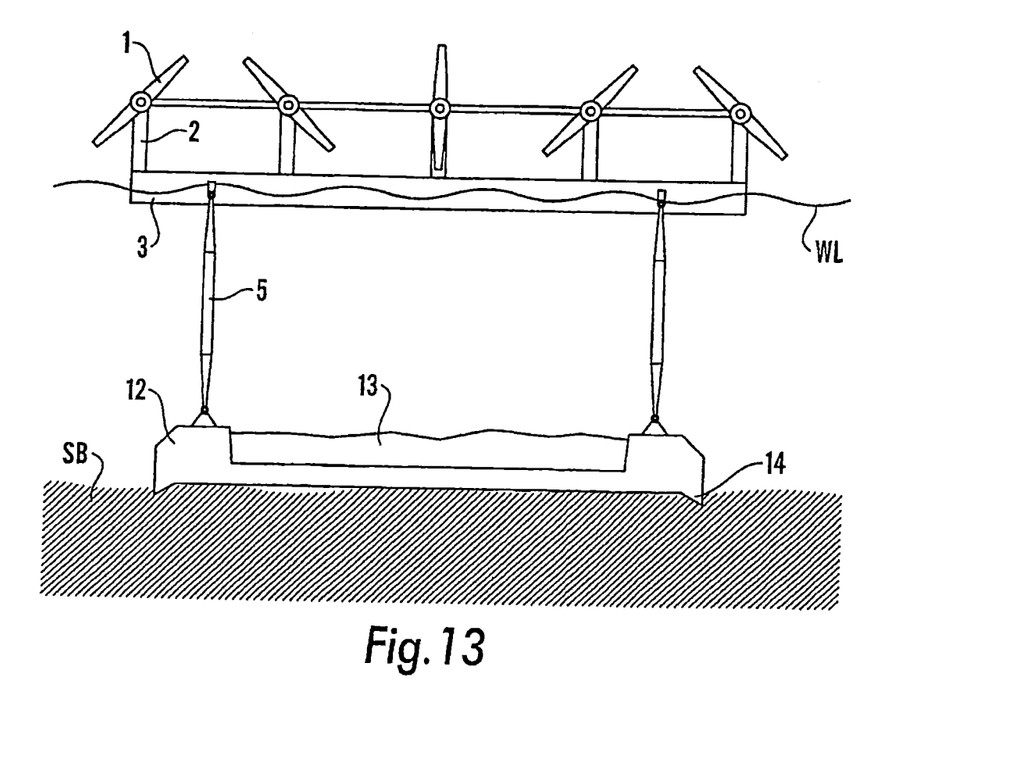
FIG. 13 is a front elevation of the turbine installation support structure of FIG. 12.

FIGS. 12 and 13 show a similar arrangement to those illustrated in FIGS. 1, 2, 3 and 4. Similar numbering and descriptions of most of the components still apply, although the main difference is that the struts (5) and planar wing-like platform or false seabed structure (3) are shown as being attached to a massive foundation (12) which has been sunk onto the seabed or riverbed to avoid the need for piling or drilling supports and anchorages. The foundation may possibly be made from concrete or some similar durable and low cost material in such a way that it has a hollow centre which enables it to be floated to the site. The hollow centre may be filled with sand or rocks (13) after it has been positioned in order to add mass so as to enhance its stability. Once the massive foundation is in place the struts can be pivoted from pinned attachments to permit the deck, wing or false seabed to be lifted to the surface in the manner illustrated.

The massive foundation may rely solely on its weight and friction to engage with the seabed and prevent movement, but may also be advantageously assisted in this function by shaped spikes or flukes (shown schematically as 14) which will penetrate the seabed or in some cases it will be securely pinned or anchored using ground anchors (not illustrated).

Figure 14:
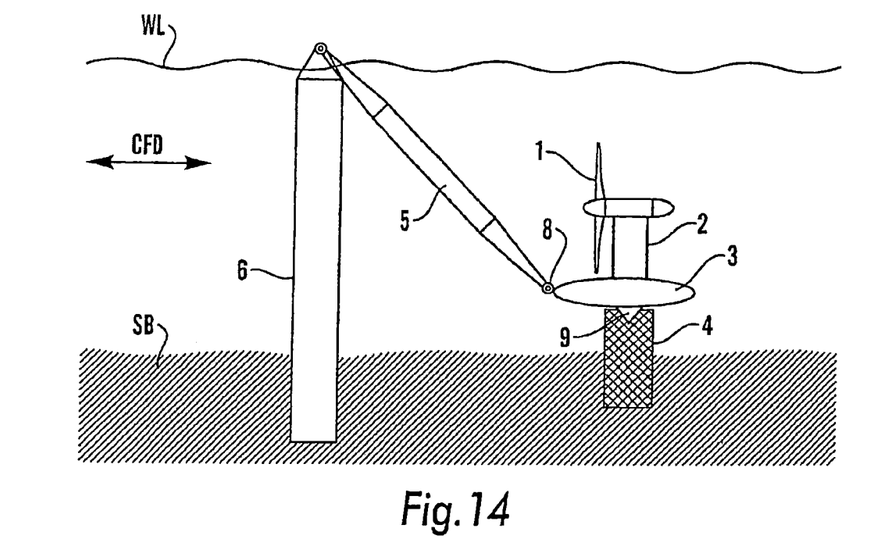
FIG. 14 is a side elevation illustrating a still further embodiment of a turbine installation support structure incorporating the concepts of the present invention and when the associated turbine(s) are in their operational positions.
Figure 15:
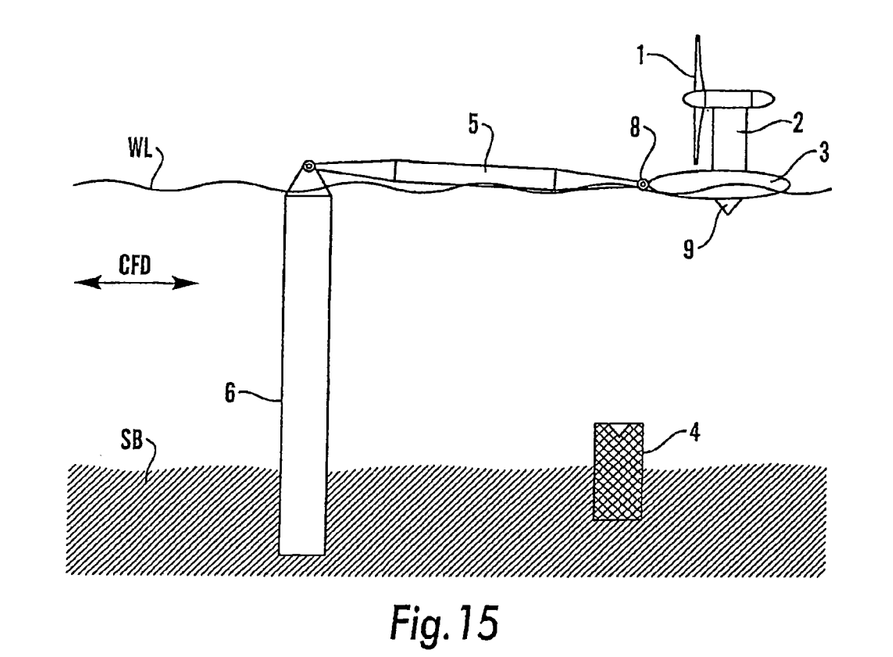
FIG. 15 is a side elevation of the turbine installation support structure of FIG. 14, when the turbine installation is in the raised position.

Lastly, FIGS. 14 and 15 illustrate a variation of the concept so far described in which it may be advantageous for the pile(s) or anchor point(s) (6) to be tall enough to reach above the surface of the sea or river. This may occur for convenience in marking the location of the system but the pile or anchor point may equally be part of a bridge, pier or other such structure and this therefore offers a possibility for adding power plant without the requirement for significant underwater operations. It can be seen that in this embodiment the struts (5) are inclined when the planar wing-like platform or false seabed structure (3) is in its lowered and operational position and they are horizontal or near horizontal when the system is raised to the surface. As with the other embodiments already disclosed, the support or supports (4) may be on the seabed or riverbed as illustrated, or they may be attached to the underside of the planar wing-like platform or false seabed structure (3) as in FIGS. 5 and 6.

It is of course also possible to have a configuration where the pile(s) or anchor point(s) (6) could be of some height in between those illustrated in FIGS. 1 and 14, and this configuration would lie within the scope of the proposals of this invention.

In practice, as has been indicated in the Drawings the generally rectangular planar deck or raft will have a longer dimension that will be sufficient to accommodate the overall width of however many individual turbines are required to be attached to its upper surface. Moreover the longer dimension will be set normal to the direction of flow of the currents so that the turbines which will be attached to its upper surface are arranged laterally across the current with the operational profile of all the rotors normal to the flow so as to intercept as much of the water flow as possible. In effect, the structure will resemble a rectangular plan form "wing" suspended in the water column with a row of turbines arranged above it. Generally the turbines and the power trains they drive will be supported above the deck by vertically aligned streamlined struts securely attached to the deck structure.

The cross section or profile of the rectangular surface or deck (considered in cross-section parallel to the direction of flow) needs to be streamlined for two reasons, namely to minimise the drag it will experience from the passing current and also to assist in orientating the flow in such a way as to minimise turbulence in the flow passing over the top of the surface and through the rotors. In order to provide a streamlined surface, the leading and trailing edges of the profile with respect to the flow of water will be tapered either to a sharp edge or more preferably to a narrow but rounded edge much like the leading edge of the wing of an aircraft or the hydrovane of a submarine or ship stabiliser. In situations where a tidal flow occurs and the direction of the current reverses periodically (with the ebb and flood of the tides), the surface will have a profile streamlined to accept flow with minimum drag in either direction.

However, in the same way as with our above referenced earlier patent application, GB 2396666 "Water Turbine Support Structures", the surface of the planar surface or deck may generally be curved when viewed in a cross section parallel to the flow, such that it may accelerate or decelerate the flow passing over it so as to improve the velocity distribution by reducing "velocity shear" and also optionally to increase the flow over the top surface and through the turbine rotors by diverting flow which would have otherwise passed underneath it. To achieve this flow enhancement, the cross section of the rectangular planar surface or deck may (in some but not all cases) also be asymmetrical or cambered in cross section (i.e convex on one side and possibly concave, flat or at least less convex on the other) in such a way that it generates a lift force perpendicular to the current in much the same way as an airfoil or hydrofoil. Due to the generation of lift, there will effectively be what fluid dynamicists know as a "circulation" relative to the cross section of the rectangular planar surface, which can be used to increase the flow over the top of the surface relative to the flow passing underneath it, and in this way the turbines will gain some enhancement in the velocity of the flow through the rotors and consequently some enhancement of the power they can produce. Although in most cases said planar wing-like surface will be installed with its chord line (the line connecting the leading and trailing edges) at zero angle of incidence to the flow, there may be reasons for it to be installed at a small angle of incidence to the flow to achieve particular effects in terms of improving flow through the rotors.

In this way, not only will the planar surface or deck act as a secure structure to carry the turbine rotor(s) but it will also be designed so as to improve the uniformity and also to increase the velocity of the flow through the rotor(s) which will enhance their performance and efficiency compared with operation in unmodified flow.

A common factor for all embodiments of this invention is that the aforementioned planar support structure or wing-like arrangement is able to be positioned with its planar surface horizontal (or nearly horizontal) on a support such that it can be sunk to a position near the sea or river bed with its longitudinal axis normal to the direction of flow of the currents. When positioned in this way the row of turbines arranged along its upper surface are aligned such that they present their actuator disk surface or rotor planes in a row normal to the flow and so that the passing current will most effectively drive said rotors.

If the flow is in one direction as with a river, then unidirectional rotors may be used, but if the flow is bi-directional as with tidal flows, then rotors must be employed which can function with the flow in either direction. A possibility for achieving this with axial flow type rotors, which are believed to be the most efficient option so far known, is through blade pitch control through 180 degrees as described in our earlier patent GB 2347976.

The aforementioned wing-like planar surface with a row of turbines arranged along its upper surface will experience a large thrust force in the direction of flow of the current when the turbines are operating, and some thrust force whenever the current is flowing even if they are not operating. This thrust will be in proportion to the total area of the rotors and to the square of the velocity of the current. Therefore it is essential to provide means to prevent it from being displaced or overturned by these forces. This requirement can be achieved by provision of one, or more generally two, and in some cases possibly a plurality, of struts which are connected between an attachment or anchorage point on the bed of the sea or river so as to be aligned approximately parallel with the direction of the current, and one of the longer edges of the wing-like planar surface.

To clarify this arrangement, in plan view the wing-like planar surface is arranged such that its longer axis is normal to the flow in a horizontal plane and the aforementioned struts to prevent it moving or toppling are attached such that they are all approximately horizontally and symmetrically disposed at right angles to the longest axis of the wing-like planar surface; i.e. aligned with the direction of the current. The opposite end of each strut is attached to an anchor point either embedded in the sea or river bed or else of sufficiently massive construction to engage securely with the sea or river bed such that no slippage can take place Moreover the aforementioned struts (or possibly a strut) are generally attached at each end (i.e. at the point of attachment to the edge of the wing-like planer surface and also at the point of attachment to the anchorages) by pinned joints, hinged joints or ball joints such that they can articulate through and angle of at least 90 degrees relative to the fixed anchorage point(s) on the sea or river bed.

A further fundamental feature of this invention which applies to all embodiments is that the wing-like planar surface with its array of turbines distributed along its upper surface is free to lift from whatever supports are provided for it on the seabed in such a way that it can reach the water surface; the method of lift may be buoyancy of the planar surface or some other external means of providing a vertical force to lift it such as a surface vessel with a crane or winch based lifting system. A further method for lifting and lowering the planar surface is to have it designed to be near neutral in its buoyancy so that a relatively small force is needed to raise or lower it; hence it may be raised by utilising artificially induced lift forces generated by hingeable flaps attached to the planar surface or even by using powered water jets or thrusters attached to the planar surface to raise and lower it. Said water jets or thrusters may be built into the surface itself. Where it is of near-neutral buoyancy or even in cases where it has significant weight it may be desirable to provide a locking mechanism to engage with the seabed support structure to ensure the planar surface cannot be accidentally lifted or displaced while the turbines are in operation.

When the wing-like planar surface is lifted in this way, the aforementioned struts can allow this movement thanks to the pinned joints or hinges at both the anchor point and where they attach to the edge of the wing-like planar surface. Since the struts are pinned to fixed anchor points on the sea or river bed, they can describe an arc in a vertical plain centred on the pin or hinge at the anchor point and therefore the struts need to be sized such that they are of greater length than the maximum depth of water at the anchor point so that their opposite ends can reach above the surface of the water at its highest likely level. Because the strut(s) will be subject to drag forces caused by the currents when they (or it) are in the rotated and raised position, an optional feature of this invention will be for them to have a streamlined profile in order to minimise the aforementioned drag forces.

Therefore the wing-like planar surface is constrained to rise through the water column following the arc traced by the struts to which it is pinned, until it emerges onto the surface of the water. In such a situation the turbines will be positioned above the water level so that they may more readily be maintained, serviced or repaired, or installation or removal of the systems may be facilitated, without recourse to underwater operations of any kind.

From the forgoing it will be appreciated that the present invention permits the following arrangement to be achieved:—

1. A row of turbines arrayed normal to the direction of flow in the water column of a river or a tidal stream mounted on the upper surface of a horizontal wing-like platform forming support structure which can rest on one or more supports separating it from the seabed or the riverbed.

2. The support structures together with its array of turbines is prevented from being displaced or overturned by one, or preferably two (or more) horizontal (or approximately horizontal) struts arranged in the direction of flow of the current in order to connect it to fixed anchor points (or an anchor point) set into the sea bed or river bed.

3. Said struts are pin-jointed or hinged such that they can permit the platform with its array of turbines to be lifted through a vertical arc until it reaches the water surface, so as to allow access to the turbines for maintenance, servicing, repairs or replacement. When raised the struts act as a mooring arrangement to hold the platform and its array of turbines in place even if strong tidal or river currents are flowing.

4. The aforementioned platform may have a profile when considered in cross-section parallel to the direction of flow such that the profile shape provides streamlining (to minimise drag) as well as having a shape such that it can enhance the flow over the top of the platform which passes through the turbine rotors. This enhancement can include reducing the velocity sheer by causing the flow immediately above the platform to accelerate and it can also include the deflection of flow from lower levels in the water column to increase the effective velocity passing through the rotor(s).

The invention claimed is:

1. A support system for at least one water drivable turbine that when in operation is immersed in a column of flowing water, comprising
    a deck for supporting said at least one water drivable turbine when immersed, the deck having an inherent buoyancy, the deck being of elongate form having opposite ends attached via struts to anchor points located in adjacent opposite end regions of the deck in a river or sea bed, the struts being of sufficient length to permit the deck to be displaced between a lowered position sufficient to immerse the at least one water drivable turbine and a raised position in which the at least one water drivable turbine is above water level, and
    at least one support fixed in the river or sea bed at a location spaced from the anchor points at such a distance that, when the deck is displaced to the lowered position, the deck contacts the at least one support.

2. A support system as claimed in claim 1 wherein the deck has a rectangular cross section in a horizontal plane.

3. A support system as claimed in claim 2, wherein the deck has a planar smooth surface of approximately rectangular form with rounded corners when viewed from directly above.

4. A support system as claimed in claim 2, wherein the rectangular deck is of such construction as to be free from undesired flexural movements.

5. A support system as claimed in claim 1, wherein an upper surface of the deck exhibits an even and smooth surface immediately below the at least one turbine mounted thereupon, the support system being such that the presence of the deck upper surface serves to enhance the evenness of water flow over the surface thereof as compared with the flow over the generally rough and uneven surface of natural river or sea beds.

6. A support system as claimed in claim 1, and further comprising
    location means provided at the underside of the deck for contacting the at least one support anchored in and upstanding from the river or sea bed when the deck is in the lowered position.

7. A support system as claimed in claim 1, wherein the struts comprise anchoring means, the anchoring means comprising piles positionally set into the river or sea bed.

8. A support system as claimed in claim 1, and further comprising
    pivotal connections associated with the struts to facilitate articulation of the struts in such manner that the struts are rotatable through a vertically disposed arc relative to the river or sea bed.

9. A support system as claimed in claim 1, wherein the struts, when the deck is in the lowered position, are arranged to be horizontal in the direction of the water flows with respect to the at least one turbine when operating, the support system being such as counteract thrust forces arising from said water flows.

10. A support system as claimed in claim 1, wherein the deck is of streamlined cross-section and has a convex upper surface, the support system being such as to increase the mean water flow velocity through turbine rotors, in such manner as to improve power outputs of the turbine rotors.

11. A support system as claimed in claim 1, wherein the deck is profiled to reduce water flow velocity shear in such manner as to reduce turbulent flow through turbine rotors, to enhance efficiency of turbine energy capture and to reduce fatigue loads on the turbine rotors.

12. A support system as claimed in claim 1, further comprising
a keying device attached to the lower surface of the deck to engage the at least one support to ensure accurate positioning of the deck in the lower position.

13. A support system as claimed in claim 1, with, when two or more supports are provided, adjustment means for enabling adjustability of a support height enabling leveling of the deck to accommodate unevenness in the sea bed level.

14. A support system as claimed in claim 1, wherein the at least one support for the immersed deck extends across the full width of the deck, the support system being such that no significant passage is provided for water to pass beneath the deck, whereby substantially all of the water flowing towards the deck is caused to travel over the deck thereby to enhance the mean velocity of the water passing through the at least one turbine.

15. A support system as claimed in claims 1, wherein the deck is arranged to have neutral buoyancy, the support system being such as to facilitate the raising and lowering thereof relative to the sea bed.

* * * * *